United States Patent Office 3,842,019
Patented Oct. 15, 1974

3,842,019
USE OF SULFONIC ACID SALTS IN CATIONIC POLYMERIZATION
James E. Kropp, Maplewood, Minn., assignor to Minnesota Mining and Manufacturing Company, St. Paul, Minn.
No Drawing. Continuation-in-part of application Ser. No. 216,744, Jan. 10, 1972, which is a continuation-in-part of application Ser. No. 813,758, Apr. 4, 1969, both now abandoned. This application Mar. 1, 1973, Ser. No. 336,939
Int. Cl. C08g 23/14
U.S. Cl. 260—2 EP                              23 Claims

ABSTRACT OF THE DISCLOSURE

Sulfonic acid salts, such as $CF_3SO_3Ag$, are used as latent catalysts in the curing or polymerization of cationic sensitive monomers, such as epoxides, vinyl ethers, N-vinyl compounds, aziridines, ethylenically unsaturated hydrocarbons, and acetals.

---

This application is a continuation-in-part of my copending application Ser. No. 216,744, filed Jan. 10, 1972 and now abandoned which was a continuation-in-part of my application Ser. No. 813,758, filed Apr. 4, 1969, now forfeited.

This invention relates to the curing of cationic sensitive monomers, such as epoxides which can be used, for example, as adhesives, impregnants, poting resins, etc. In another aspect, it relates to a process for catalyzing the curing of such monomers with a new catalyst therefor, and to the cured products produced thereby. In another aspect, it relates to mixtures of such monomers and latent catalysts for the curing thereof. In a further aspect, it relates to the curing of such monomers with latent catalysts which are activated by heat or other means.

BACKGROUND OF THE PRIOR ART

The curing of cationic sensitive monomers with acid catalysts is well known in the art. For example, epoxides can be cured with boron trifluoride and complexes thereof; styrene can be polymerized with aluminum trichloride; and 1,4 - diazobicyclo[2.2.2]octane can be polymerized with benzene sulfonic acid. While the curing of such monomers with such catalysts has been found to be advantageous in many cases, the use of some acid catalysts is often objectionable because such catalysts are highly corrosive to various substrates, such as metals. Other acid catalysts are objectionable because of their moisture sensitivity, their use requiring pre-drying of materials and special handling and storing techniques to exclude moisture, while other such catalysts are objectionable because of their volatility. Further, many of these acid catalysts rapidly are admixed and cannot be used where a definite or prolonged shelf life and/or pot life is desired or required. Though some of these prior art acid catalysts can be used in a latent form, e.g. $BF_3 \cdot NH_2C_2H_5$, their latency is affected by moisture while prolonged latency is difficult to achieve; in addition, when these latent catalysts are activated, this gives rise to aforementioned objectionable corrosiveness or volatility.

Recently, the use of certain metal salts of perfluoroalkanesulfonic acids have been disclosed (U.S. Pat. No. 3,347,676, British Pat. No. 1,096,048, and French Pat. No. 1,495,784) as catalysts for polymerizing cationically sensitive monomers. However, such polymerization requires the joint use of certain halide promoters or photoreducible ketones and the exposure of the polymerizable mixture to actinic light during the course of the polymerization to produce cured products.

This invention provides a novel class of latent catalysts for the thermal polymerization of cationic sensitive monomers. These latent catalysts and the acids generated therefrom upon activation with heat are only slightly corrosive and are non-volatile during use. These latent catalysts can be used in admixture with the monomers to provide latently curable compositions having desirable shelf or pot life. No halide promoter or photoreducible ketone or actinic light is required.

DESCRIPTION OF THE INVENTION

The novel class of latent curing catalysts of this invention are salts of sulfonic acid, which preferably have the general formula:

$$(R_fSO_3)_nM \qquad \qquad I$$

where $R_f$ is fluoroalkyl (preferably perfluoroalkyl, but including perfluoroalkylene, i.e., $-CF_2(CF_2)_y-$) having, for example, 1 to 18 carbons and preferably 1 to 8 carbons, M is ammonium ($-NH_4$), qua'ernary ammonium, cation of amine (i.e., a protonated amine), or preferably, a mono- or polyvalent cation preferably having a valence of 1–5, of a metal selected from the group consisting of metals of Groups I to V and VIII, subgroups VIB and VIIB, and those of the lanthanide and actinide series of the Periodic Table, and $n$ is an integer equal to the valence of M.

Representative metal salts which can be used as latent catalysts to cure cationic sensitive monomers include the metal salts of $CF_3SO_3H$ (the preferred acid in this invention), $C_8F_{17}SO_3H$, $CF_3C_6F_{10}SO_3H$, $C_3F_7SO_3H$, $C_2F_5SO_3H$, $C_2HF_4SO_3H$, $C_3F_7CHFCF_2SO_3H$, $(CF_3)_2CHCF_2SO_3H$, $C_4F_7SO_3H$, $(CF_3)_2CF(CF_2)_4SO_3H$, $C_4F_9CFHCF_2SO_3H$, $C_3H_7CH(CF_3)CF_2SO_3H$, $C_8F_{17}SO_3H$, $C_{11}F_{23}SO_3H$, $C_5H_{11}CFHCF_2SO_3H$, $C_7F_{15}CFHCF_2SO_3H$, and the like, including mixtures thereof. Representative of the metal cations of such metal salts are those of the metals lithium, sodium, potassium, magnesium, calcium, strontium, barium, yttrium, vanadium, manganese, cobalt, nickel copper, silver, zinc, cadmium, mercury, lead bismuth tungsten lanthanum, neodymium, tin and gadolinium. The salts of the metals of Groups III, IV, V and VIII and Subgroups IB, IIB, VIB, and VIIB are preferred because of their greater catalytic activity. (The Periodic Table referred to herein is that shown on pp. 448–449 of the Handbook of Chemistry & Physics, 34th Ed. (1961–1962), published by Chem. Rubber Pub. Co., Cleveland, Ohio.)

The sulfonic acid salts described above, as well as the free sulfonic acid precursors thereof, are non-corrosive or practically non-corrosive towards metals, which is in sharp contrast to the commonly used cationic catalysts, such as protonic and Lewis acids, which are highly corrosive to metals. Further sulfonic acid salt catalysts of this invention generally are solids and they as well as their acid precursors generally have high solubility in common solvents, such as chloroform, acetone, methanol, ether, water and other solvents, and are also soluble in many of the polymerizable cationic sensitive monomers. Salts of perfluoroalkylene disulfonic acids have solubi'ities comparable to those of the perfluoralkyl monosulfonic acids and salts and are equivalent as latent catalysts. For example, $CF_3SO_3Ag$, the preferred latent catalyst of this invention, will form a 66% weight in volume solution of butyrolacetone and is readily soluble in propylene oxide, epoxides such as cycloaliphatic epoxides, and is soluble in aliphatic or aromatic glycidyl ethers, as well as vinyl ethers such as hydroxybutyl vinyl ether, N-vinyl compounds, such as N-vinyl pyrrolidone, etc. In contrast to such acid catalysts as HCl and $BF_3$, the sulfonic acid salts and acid precursors are relatively non-volatile and thus are capable of maintaining an essentially constant catalyst concentration in those curing applications that require heating, Though the sulfonic acid salts may be hygroscopic in some instances, this property will not generally present any problems during curing and the acid precursors themselves are essentially moisture insensitive, thus allowing the polymerization of monomers without elaborate precautions to exclude moisture.

The sulfonic acid metal salts used in this invention can be prepared by simply neutralizing the sulfonic acid precursors with a metal oxide, hydroxide, or carbonate or metal salt, e.g., $AgNO_3$. For example, $CF_3SO_3H$ dissolved in a solvent, e.g., benzene, can be stirred with a suspension of a silver oxide, the water of reaction azeotroped off, the mixture filtered, and the organic phase evaporated to dryness to yield the corresponding salt, $CF_3SO_3Ag$. The sulfonic acids are well known from U.S. Pat. 2,732,398.

The amino and ammonium salts can be formed by neutralization of the sulfonic acids with a salt-forming primary, secondary, or tertiary amine, ammonia, or a quaternary ammonium hydroxide. The salt-forming amines include alkyl amines such as methylamine, ethylamine, dimethylamine, diisopropylamine, trimethylamine, triethylamine, triisopropylamine, triisobutylamine, cyclohexylamine and the like; hydroxy amines such as monoethanolamine, diethanolamine, triethanolamine, monoisopropanolamine, diisopropanolamine, triisopropanolamine, and the like; heterocyclic amines such as morpholine, pyridine, piperidine, and the like; guanidine; aromatic amines such as aniline, and the like; and quaternary ammonium hydroxides such as tetramethylammonium hydroxide, tetraethylammonium hydroxide, trimethylhydroxyethylammonium hydroxide, tetrahydroxyethylammonium hydroxide, benzyltrimethylammonium hydroxide, and the like. These latent forms of the sulfonic acid catalysts can be activated or "de-latentized" by heating them in the presence of the cationic sensitive monomers to generate the sulfonic acid in its free acid form to make it available for curing.

The term "latent catalyst" as used herein means a catalyst which does not exhibit or manifest any substantial curing or catalytic effect on monomer admixed therewith during normal storage or handling of such mixtures until the mixture is subjected to heat for the purpose of "de-latentizing" or generating the free sulfonic acid, though some small or otherwise tolerable or insignificant curing of the monomer may take place before activation, as evidenced by a slight increase in viscosity. Similarly, a composition which has latency or is characterized as being latently curable is one which during the period prior to being heated, to effect cure, exhibits little if any gelling, polymerization, etc., though some small or otherwise tolerable or insignificant curing may take place during such period.

In one aspect of this invention, latently curable compositions are initially or preliminarily exposed for a short time to actinic light, e.g. UV, so that the composition will subsequently become cured when heated. When heated, such curing will take place more rapidly than if such initial exposure or irradiation were not used. Such initial exposure in effect "photo-triggers" the curing of the composition and begins the development of cure which may proceed slowly at room temperature or rapidly at elevated temperatures. These photo-triggered systems have useful pot-life (e.g., from a few hours to months, depending on the particular system) though the duration thereof will not be as long as the latency of non-exposed compositions.

In another aspect of this invention, the latent curable compositions can be initially or preliminarily contacted with a resistive wire embedded or immersed therein and an electrical current passed through said wire to heat the same. Such resistive heating in effect "heat-triggers" the curing of the composition and begins the development of cure which may proceed slowly at room temperature or rapidly at elevated temperature. Here, again, the heat-triggered system has a useful pot life.

The preferred latent salts used in this invention can be represented by the general formula:

$$(R_fSA_3)_mM \quad\quad\quad II$$

where $R_f$ is perfluoroalkyl having 1 to 8 carbon atoms, and is preferably perfluoromethyl, as defined above in general formula I, and M is ammonium or metal cation having a valence equal to $m$ and selected from the group consisting of the cations of silver, nickel, and zinc.

Storage stable mixtures of the monomer and latent catalyst can be made up as one-part latently curable mixtures and later applied or shaped, and the applied or shaped mixture heated to release the sulfonic acid and cause polymerization of the monomer.

Where actinic light is used to produce triggered mixtures, wavelengths of 2500 A. to 7000 A. can be used from such sources as sunlight, mercury arc, fluorescent light bulbs, etc. The preferred actinic light to be used is ultraviolet light, the latter being photon energy or light of wavelengths less than 4000 A. The lower limit is usually in the range of 1800 to 2000 A., wavelengths of 2000 to 4000 A. being preferred. Irradiation sources high in ultraviolet output are preferred sources, and mercury vapor arc lamps, such as a Ferro Allied 1440 watt UV lamp, will be most useful because of the relatively intense source of the preferred UV light.

Electrical resistance heating of resinous compositions is well-known in the art for purposes of curing (e.g., see U.S. Pat. No. 3,346,442). The same technique can be used for carrying out the heat-triggering of this invention, except that the resistance wires need not be left in the triggered composition.

The length of time that the polymerizable or curable composition is exposed to actinic light for the purpose of photo-triggering or is heated with a resistance wire for purposes of heat-triggering, will vary and depend on the particular composition to be irradiated or heat-triggered, as well as the light source or resistance wires used and the temperature. In any event, the triggering will be of such short duration that the triggered polymerization mixture is still soluble (i.e., uncured) at the end of the exposure. Generally, exposures times will vary between 1 minute and 1 hour, and the particular duration to be used can be determined empirically by simple routine exposure of samples.

The polymerization or curing of cationic sensitive monomers in the presence of the sulfonic acid salt catalysts can be carried out by simply mixing the monomeric material with the salt catalyst and allowing the curing to take place at an elevated temperature with or without preliminary photo-triggering or heat-triggering the composition as described above.

As mentioned above, the sulfonic acid metal salts are soluble in common solvents as well as in a wide variety of polymerizable monomers, which property makes it convenient to mix the latent catalyst with the monomers to obtain a homogeneous mixture. Solvents which can be used for the polymerization representatively include solvents such as acetone, butyrolactone, acetonitrile, methanol, Cellosolve, dimethylformamide, and the like. In some cases, it will be desirable to mix the monomer with a solution of the sulfonic acid salt catalyst in a solvent, such as water, acetonitrile, butyrolactone, phenyl glycidyl ether, etc.

In general, the polymerization can be carried out at room temperature or elevated temperatures, e.g., 70 to 425° F., preferably 120 to 400° F.

The particular amount of catalyst to be used and temperature of polymerization will vary, of course, and be dependent on the particular monomers used and the particular catalyst used, as well as the particular application to be made and the period of latency desired. Generally the more acidic the salt, the shorter the period of latency obtained. The acidity of the sulfonic acid salt can be determined by the method described in H.T.S.

Britain in "Hydrogen Ions," 3rd ed., Vol. II, Chap. XXIII, published by Chapman & Hall, London (1942). The silver salts of the perfluoromethane sulfonic acids are preferred where extended periods of latency are desired (e.g., up to one year or more).

Generally, the amount of sulfonic acid metal salt to be used will be in the range of 0.01 to 20 weight percent, preferably 0.1 to 5 weight percent, based on the weight of cationic monomeric material.

The monomers that can be cured or polymerized with the sulfonic acid metal salt catalyst of this invention, using the latter in a catalytic amount, are those known to undergo cationic polymerization and include ethylenically unsaturated hydrocarbons and those which contain a hetero oxygen or nitrogen atom attached to one of the carbon atoms of a carbon-carbon double bond (i.e., ethylenic unsaturation), e.g., monomers that contain the structure

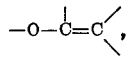

or monomers which polymerize by ring opening of cyclic groups containing hetero O or N ring atoms. An extensive list of cationic monomers which can be used in this invention is given in U.S. Pat. No. 3,347,676.

Representative ethylenically unsaturated hydrocarbons which can be used in this invention include isobutylene, 1-butene, 1,3-butadiene, 2-methyl-1-heptene, 1-dodecene, isoprene, styrene, vinylcyclohexane, vinylbenzene, divinylbenzene, dipropenylbenzene, tripropenylbenzene and the like, those having up to 13 carbon atoms being preferred, especially the vinyl benzenes.

One useful class of the cationic sensitive monomers can be represented by the general formula:

     III where X is —O— or —NR'— (where R' is hydrogen or lower alkyl), R is hydrocarbyl, halohydrocarbyl, or hydroxyhydro carbyl when X is oxygen, or R is hydrocarbyl or hydrocarbylsulfonyl when X is nitrogen, and Y is hydrogen, alkyl, aryl, or other hydrocarbyl, or R (as hydrocarbyl) and R can be connected to form a 5 or 6-membered cyclic structure containing nitrogen as a hetero ring atom. The term "hydrocarbyl" is used herein in its usual sense to mean alkyl, alkenyl, aryl, cycloalkyl, cycloalkenyl, alkaryl, arylalkyl, and the like.

In general, monomers of this type contain a vinyl group and are typified by vinyl alkyl ethers, such as vinyl methyl ether, vinyl ethyl ether, vinyl n-butyl ether, vinyl 2-chloroethyl ether, vinyl isobutyl ether, vinyl phenyl ether and vinyl 2-ethylhexyl ether, vinyl ethers of substituted aliphatic alcohols such as ω-hydroxy butyl vinyl ether, and N-vinyl compounds such as N-vinyl-N-methyl octanesulfonamide and N-vinylpyrrolidone. A description of vinyl monomers and their use in preparing polymers is set forth in "Vinyl and Related Polymers," by Schildknecht, published by John Wiley & Sons, Inc., New York (1952).

Cationic sensitive monomers which polymerize by ring opening of O-heterocyclic groups and which can be used in the practice of this invention are those which typically contain one or more epoxy groups, which has the structure.

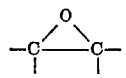

Such monomers, broadly called epoxides, or vicinal epoxides, include epoxy compounds and epoxides of the polymeric type and can be aliphatic, cycloaliphatic, aromatic or heterocyclic and will typically have an epoxy equivalency (i.e., the number of epoxy groups contained in the average molecule) of from 1.0 to 6.0, preferably 1 to 3, this value being the average molecular weight of the epoxide divided by the epoxide equivalent weight.

Such epoxide monomers are well known and include such epoxides as epichlorohydrins, e.g. epichlorohydrin, alkylene oxides, e.g., propylene oxide, styrene oxide, alkenyl oxides, e.g., butadiene oxide, glycidyl esters, e.g., ethyl glycidate, glycidyl-type epoxy resins, e.g., the diglycidyl ethers of Bisphenol A and of novolak resins, such as described in "Handbook of Epoxy Resins," by Lee and Neville, McGraw-Hill Book Co., New York (1967).

Particularly useful epoxides which can be used in this invention are those which contain one or more cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl - 3, 4 - epoxy-2-methylcyclohexane-carboxylate, and bis(3,4-epoxy-6-methylcyclohexylmethyl) adipate. For a more detailed list of useful epoxides of this nature, reference is made to U.S. Pat No. 3,117,099.

Further epoxides which are particularly useful in the practice of this invention include glycidyl ether monomers of the formula

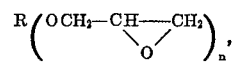

where R is alkyl or aryl and $n$ is an integer of 1 to 6. An example is the glycidyl ethers of polyhydric phenols obtained by reacting a polyhydric phenol with an excess of chlorohydrin, such epichlorohydrin, e.g., the diglycidyl ether of 2,2-bis(2,3-epoxy propoxyphenol)-propane. Further examples of epoxides of this type which can be used in the practice of this invention are described in U.S. Pat. No. 3,018,262.

Other cationic sensitive monomers which can be polymerized in the practice of this invention include those which polymerize by ring opening of N-heterocyclic groups, which have the structure

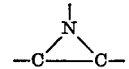

Such monomers include those having the structures

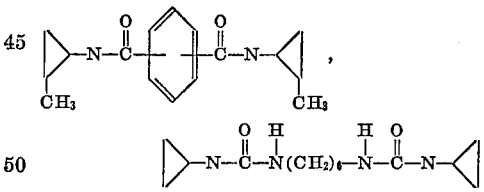

and

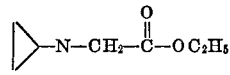

Another useful class of monomers which can be used are the acetals, such as trioxane.

There is a host of commercially available cationic sensitive monomers which can be used in this invention. In particular, epoxides which are readily available include propylene oxide, epichlorohydrin, styrene oxide, vinyl cyclohexene oxide, glycidol, glycidyl methacrylate, phenyl glycidyl ether, 1,2-butane oxide, diglycidyl ether of Bisphenol A (e.g., Epon 828 and DER 332), vinylcyclohexene dioxide (e.g., ERL-4206), 3,4-epoxycyclohexylmethyl-3,4-epoxycyclohexane carboxylate (e.g., ERL-4221), 3,4 - epoxy - 6-methylcyclohexylmethyl-3,4-epoxy-6-methylcyclohexane carboxylate (e.g., ERL-4201), bis(3,4-epoxy-6-methylcyclohexylmethyl)adipate (e.g., ERL-0400), aliphatic epoxy modified with polypropylene glycol (e.g., ERL-4050 and ERL-4052), dipentene dioxide (e.g., ERL–4269), epoxidized polybutadiene (e.g., Oxiron 2001), silicone epoxy (e.g., Syl-Kem 90), 1,4-butanediol diglycidyl ether (e.g., Araldite RD–2), polyglydicyl ether of phenolformaldehyde novolak (e.g., DEN–431, Epi-Rez 521 and DEN–438), resorcinol diglycidyl ether (e.g., Kopoxite), polyglycol diepoxide (e.g., DER 736), and polyacrylate epoxide (e.g., Epocryl U–14), urethane modified epoxy (e.g., QX3599), and polyfunctional flexible epoxies (e.g., Flexibilizer 151).

Preferred cationic sensitive monomers are those of the group consisting of vicinal epoxides, vinyl ethers, N-vinyl compounds, aziridines, ethylenically unsaturated hydrocarbons and acetals.

The curable compositions of this invention, comprising the cationic sensitive monomer and sulfonic acid salt, can be used for applications like those cationic sensitive monomer systems cured with other catalysts, such as epoxides cured with $BF_3 \cdot NHC_2H_5$. For example, the compositions of this invention can be used as adhesives, caulking and sealing compounds, casting and molding compounds, potting and encapsulating compounds, impregnating and coating compounds, etc., depending on the particular monomers and/or catalyst used. The latently curable composition can be used as a one-part or cured-in-place system, such capability enhancing its use for the applications mentioned above. It is also within the scope of this invention to incoporate into the latently curable compositions such conventional materials as fillers, pigments, dyes, plasticizers, extenders, solvents, etc., the use of fillers, such as diatomaceous earth, to establish special properties. Coventional co-curatives which will intercure with the cationic monomer can also be incorporated. One particular application where such capability can be capitalized on is in the composite area, where such latently curable compositions can be used to coat or impregnate glass or graphite fibers for binding or decorative product or for structural purposes, e.g., jet engine fan blades or other moldable panels. The latently curable compositions also can be used to coat or impregnate for insulation or protective purposes electrical motor windings or coils, transformers, capacitors, electrical terminals, cables, and other electrical devices.

The object and advantages of this invention are further illustrated by the following examples, but the particular materials and amounts thereof recited in these examples as well as other conditions and details should be be construed to unduly limit this invention.

Example 1

Samples of Epon 828 epoxy resin were mixed with 5 wt. percent $CF_3SO_3Ag$. One of these resin-catalyst samples was exposed at room temperature to UV light for 15 min. with a Ferro Allied 1440 watt lamp to give a dark uncured sample which cured to a hard solid after standing for 5 days. Another resin-catalyst sample gelled after storage for 70 days at 122° F. A third sample of this resin-catalyst mixture remained fluid after storage for more than one year at room temperature. The above shows the desired latent curing effect of $CF_3SO_3Ag$ which allows a prolonged pot life of the mixture and also demonstrates the heat curability and the photo-triggerability of these mixtures.

Example 2

Samples of Epon 828 epoxy resin mixed with 1 wt. percent $CF_3SO_3Ag$ and ERL–4050 epoxy resin mixed with 5 wt. percent of $CF_3SO_3Ag$ were heated at various temperatures for which thermal gel times were measured. These results are shown in Table I:

TABLE I

| | Gel time (minutes) | |
|---|---|---|
| Temp. (° F.) | Epon 828 plus 1 wt. percent $CF_3SO_3Ag$ | ERL–4050 plus 5 wt. percent $CF_3SO_3Ag$ |
| 122 | 70,000 | 95,000 |
| 200 | | 250 |
| 250 | 100 | |
| 275 | | 10 |
| 300 | 15 | |
| 350 | 2 | 2 |
| 400 | 0.5 | 1 |

Example 3

One gram samples of Epon 828 and ERL–4050 epoxy resins were treated with 20, 5, 3, 1, 0.1, and 0.01 wt. percent of $CF_3SO_3Ag$. All of these samples cured to a hard solid in about 15 min. when heated at 400° F., which shows that the catalyst is effective at a wide variation of concentrations.

Example 4

One gram samples of the resins listed below in Table II were mixed with 5 wt. percent $CF_3SO_3Ag$ and heated at 400° F. and the gel time noted and compared at that time with uncatalyzed resin at 400° F.

TABLE II

| | Time to gel (minutes) at 400° F. | |
|---|---|---|
| Resin | Catalyzed resin | Uncatalyzed resin |
| Epon 828 epoxy | 1 | Fluid. |
| DER 736 epoxy | 1 | Do. |
| DEN 438 epoxy | 4 | Do. |
| Epocryl U-14 epoxy | 5 | Do. |
| ERL 4221 epoxy | <1 | Do. |
| ERL 4050 epoxy | <1 | Do. |
| Phenyl glycidyl ether | 15 | Do. |
| Epichlorohydrin | 15 | Volatilized. |
| Styrene oxide | 4 | Do. |
| 1,2-butene oxide | 5 | Do. |
| Glycidyl acrylate | 5 | Fluid. |
| Diethylene glycol divinyl ether | <1 | Volatilized. |
| Trioxane | 5 | Do. |
| N-vinyl pyrrolidone | a 15 | Fluid. |
| N-vinyl-n-methyl sulfonamide | 1 | Do. |
| N-(carboethoxymethyl)aziridine | 30 | Volatilized. |
| m-Diisopropenylbenzene | a 10 | Do. | a 300° F.

Example 5

(a) Mixtures of ERL–4050 epoxy resin containing 1 wt. percent of various sulfonic acid salt catalysts were prepared and heated to determine the degree of catalytic activity. Table III shows that some of these catalysts require longer periods of heating to effect curing of the resin.

TABLE III

| Catalyst salt | Time to cure (min.) | Cure temp. (° F.) |
|---|---|---|
| None (control) | 150–240 | 400 |
| $CF_3SO_3Ag$ | 1 | 400 |
| $(CF_3SO_3)_3Y$ | 5 | 300 |
| $(CF_3SO_3)_3La$ | 5 | 300 |
| $(CF_3SO_3)_3V$ | <1 | 300 |
| $(CF_3SO_3)_2CO$ | <5 | 300 |
| $(CF_3SO_3)_2Ni$ | <1 | 300 |
| $(CF_3SO_3)_2Cu$ | <1 | 300 |
| $(CF_3SO_3)_2Zn$ | <1 | 300 |
| $(CF_3SO_3)_2Hg$ | <1 | 300 |
| $(CF_3SO_3)_2Pb$ | 2 | 300 |
| $(CF_2SO_3)_3Bi$ | <5 | 300 |
| $(CF_3SO_3)_3Nd$ | <5 | 300 |
| $(CF_3SO_3)_3Sm$ | <5 | 300 |
| $(CF_3SO_3)_3Gd$ | <5 | 300 |
| $(CF_3SO_3)_2Cd$ | 30 | 300 |
| $(CF_3SO_3)_2Mn$ | 30 | 300 |
| $C_8F_{17}SO_3NH_4$ | <5 | 300 |
| $CF_3C_6F_{10}SO_3NH_4$ | <5 | 300 |
| $(CF_3SO_3)_2Mg$ | >138 | 300 |
| $CF_3SO_3K$ | >120 | 300 |
| $(CF_3SO_3)_2Ba$ | >120 | 300 |
| $(C_2F_5SO_3)_2Sr$ | >120 | 300 |
| $(C_8F_{17}SO_3)_2Ca$ | >120 | 300 |
| $C_2F_5SO_3Li$ | 90 | 300 |
| $C_2HF_4SO_3Na$ | <120 | 300 |

(b) Table IV shows the cure times of mixture of Epon 828 epoxy resin containing 1 wt. percent of various catalysts.

TABLE IV

| Catalyst salt | Time to cure (hrs.) | Cure temp. (° F.) |
| --- | --- | --- |
| None (control) | 21–46 | 400 |
| $CF_3SO_3Ag$ | 0.1 | 400 |
| $(CF_3SO_3)_2Ni$ | <0.05 | 300 |
| $(CF_3SO_3)_2Sn$ | 0.03 | 300 |
| $CF_3SO_3K$ | 4 | 400 |
| $(CF_3SO_3)_2Ba$ | <21 | 400 |
| $(C_2F_5SO_3)_2Sr$ | <21 | 400 |
| $(C_8F_{17}SO_3)_2Ca$ | <21 | 400 |
| $C_2HF_4SO_3Na$ | <21 | 400 |

Example 6

A number of samples of Epon 828 epoxy and ERL 4050 epoxy were mixed with 1 or 5 wt. percent of a silver trifluoromethyl sulfonate. The catalyzed samples were stored at 122° F. and the time at which the stored product gelled was noted. For purposes of comparison, similar epoxy samples containing 5 wt. percent of trifluoromethane sulfonic acid and similar epoxy samples containing 1 or 5 wt. percent of a conventional latent catalyst were prepared, stored either at room temperature or 122° F. and observed. The measured pH of aqueous solutions are also indicated. Results are set forth in Table V.

TABLE V

| Catalyst | Conc. of cat., wt. percent | Time for— Epon 828 to gel | Time for— ERL-4050 to gel | Initial pH |
| --- | --- | --- | --- | --- |
| $CF_3SO_3H$ | 5 | <1 min. (R.T.)* | <1 min. (R.T.)* |  |
| $BF_3NH_2C_2H_5$ | 5 |  | 4 days |  |
| $BF_3NH_2C_2H_5$ | 1 |  | 10 days |  |
| $CF_3SO_3Ag$ | 5 | 35 days | 58 days | 6.6 |
| $CF_3SO_3Ag$ | 1 | 33 days | 52 days | 6.6 |
| $(CF_3SO_3)_2Ni$ | 5 | 14 days | 14 days | 6.1 |
| $(CF_3SO_3)_2Zn$ | 5 |  | 4 days | 3.3 |

*R.T. means room temperature.

These data show that there is a substantial improvement over the state of the art because a latency of any of a range of durations can be attained by selecting the appropriate sulfonic acid salt. Generally, the more acidic the salt, the shorter the period of latency. As shown, a measure of the pH of an aqueous solution of the catalyst salt provides a means to predict the pot life of mixtures of this type.

Example 7

Various preparations were made containing epoxide resin and a cocurative additive to which varying amount of catalyst was added. These preparations were heated at 270° F. (unless otherwise specified) until curing was accomplished. The time required to accomplish this cure is shown in Table VI for each of the combinations prepared.

TABLE VI

| Epoxide | Cocurative | Cocurative conc. (wt. percent) | $CF_3SO_3Ag$ (wt. percent) | Cure time |
| --- | --- | --- | --- | --- |
| ERL-4050 | None | 0 | 0.1 | 4 hrs. |
| ERL-4050 | BPADO[1] | 25 | 0 | >3 days. |
| ERL-4050 | BPADO[1] | 25 | 0.1 | <72 hrs. |
| ERL-4050 | NMA[2] | 25 | 0.1 | 1 hr. |
| ERL-4050 | NMA[2] | 25 | 0 | >2 days. |
| ERL-4050 | FA[3] | 25 | 1.0 | <10 min. |
| ERL-4050 | FA[3] | 25 | 0.1 | 2 hrs. |
| ERL-4050 | FA[3] | 25 | 0 | >2 days. |
| ERL-4050 | Trioxane | 25 | 1.0 | 45 min. |
| ERL-4050 | do | 25 | 0 | <2 days. |
| ERL-4050 | PGE[4] | 25 | 0.1 | 2 hrs. at 300° F. |
| ERL-4050 | Hycar[5]1072 | 34 | 0.1 | 2 hrs. at 250° F. |
| Epon 828 | FA[3] | 25 | 0.1 | 2 hrs. |
| Epon 828 | Trioxane | 25 | 0.1 | <18 hrs. |
| Epon 828 | do | 25 | 1.0 | 2 hrs. |
| Epon 828 | BPADC[1] | 25 | 0.1 | 2 hrs. |
| Epon 828 | BPADC[1] | 25 | 1.0 | 2 hrs. |
| Epon 828 | NMA[2] | 25 | 0.1 | 1 hr. at 300° F. |
| Epon 828 | NMA[2] | 50 | 0.1 | 1 hr. at 300° F. |

[1] Bisphenol A dicyanate.
[2] Methyl nadic anhydride.
[3] Furfuryl alcohol.
[4] Phenyl glycidyl ether.
[5] Butadiene-acrylonitrile rubber.

Example 8

A mixture of 6.6. g. of Epon 828 epoxy, 3.3 g. graphite and 0.01 g. of $CF_3SO_3Ag$ cured at 350° F. for 1 hr. to give a hard molded disc which could be utilized as a solid lubricant with a pencil hardness of H.

Example 9

The rate of corrosion of iron was determined (by Tafel extrapolation, M. G. Fontana and N. D. Greene, Corrosion Engineering, McGraw-Hill Book Co., New York, 1967, pp. 342-4) by potentio-static polarization curves in a static 0.5% NaCl solution with $10^{-3}$ M additions of the various catalysts at 23° C. Oxygen was not excluded. The iron specimen was pure iron (99.9% Fe). The results are shown in Table VII below.

TABLE VII

| Catalyst: | Corrosion rate (mils/yr.) |
| --- | --- |
| None (control) | 16 |
| HCl | [1] 77 |
| $BF_3 \cdot O(C_2H_5)_2$ | 98 |
| $CF_3SO_3H$ | 29 |

[1] Ave. of three runs; all other results in Table VII are averages of 2 runs.

The above data show that under similar conditions the trifluoromethane sulfonic acid (which is generated by activation of the latent salts of this invention) resulted in significantly less corrosion on a typical metal substrate than that which resulted when HCl and the boron trifluoride complex catalysts were used.

Example 10

A 5 g. mixture consisting of 20 parts Epon 828 epoxy and 15 parts tetrapropylene succinic anhydride and 1 wt. percent $AgSO_3CF_3$ was placed into an open aluminum cup. A coiled 6-inch long No. 24 Nichrome wire was inserted into the fluid mixture and a current of 6.5 amps was applied for 10 seconds to cause "heat-triggering" of the mixture. The resin became very fluid and precipitated metallic silver. When the current was terminated and the sample cooled, the sample showed a marked increase in viscosity. The current was applied for an additional 60 sec. and the mixture began to exotherm. Upon cooling, the resin was cured to a hard solid in the thick portion of the sample but still fluid in the thin sections. Upon standing for 3 months at room temperature, this fluid portion was cured to a hard solid.

Example 11

Sample composition (a) consisting of 30 parts of Epi-Rez 521 epoxide, 30 parts of DEN 438 epoxide, 30 parts of Epon 828 epoxide, 10 parts QX 3599 epoxide and 0.2 parts of CF₃SO₃Ag, and sample composition (b) consisting of 35 parts Epi-Rez 421, 25 parts DEN 438, 30 parts Epon 828, 10 parts Flexibilizer 151 epoxide and 0.2 parts of $CF_3SO_3Ag$ were used as resin in the following manner.

Graphite fibers (HMG 50 from Hitco Corp.) were hot melt dip coated at 200° F. in a bath of the above sample composition (a) and (b) and the excess sample composition metered off through a nip roll which were also heated at 200° F. The resulting saturated fibers were placed on a silicon release paper liner and cooled to room temperature, resulting in a "pre-preg" which was wound onto a roll. This pre-preg was cut in 10″ lengths and 12 plys were laid up as an 8″ x 10″ unidirectional sample. This sample was press cured into a laminate by gelling for 8 min. at 350° F. with contact pressure. The pressure was then increased to 200 p.s.i. and the sample cured for 1 hr. at 350° F. and post-cured for 4 hrs. at 350° F. The resulting cured laminate had the properties set forth in Table VIII.

TABLE VIII

| Property | Laminate made with— | |
|---|---|---|
| | Sample Comp. (a) | Sampl Comp. (b) |
| Gel time at 300° F., min | 12.0 | 18.2 |
| Heat penetration (10 mils), ° C | 200 | 900 |
| Compression strength (−65° F.), p.s.i | 43,860 | 45,000 |
| Flexural strength (77° F.), p.s.i | 127,300 | 132,700 |
| Flexural modulus (77° F.), p.s.i | 27,400,000 | 28,100,000 |

Example 12

To a solution of 0.5 g. of tungsten pentachloride in 50 ml. of methanol was added the silver salt of trifluoromethane sulfonic acid. As the silver salt was added to the yellow solution, a precipitate of silver chloride appeared. The mixture turned blue at the end-point of the reaction. This mixture was filtered and an excess of $CF_3SO_3Ag$ was added to a portion of the blue filtrate yielding only a trace of additional precipitate. The major portion of the filtrate was evaporated to yield a blue semisolid. When triturated with 100 ml. of benzene, the salt solidified and was filtered to give the hygroscopic tungsten salt of trifluoromethane sulfonic acid.

The above tungsten salt was added to ERL 4221 epoxide as 1% dispersion and the resulting mixture heated for 10 minutes at 240° F. to yield a cured epoxide. Another portion of this mixture was stored at room temperature for more than 40 days with no gelation occurring.

Example 13

To 4 g. of liquid diglycidyl ether of Bisphenol A (Epon 828) was added 0.04 g. of pyridinium trifluoromethane sulfonate. This catalyzed mixture was placed in an aluminum cup and heated at 284° F. for 2 hrs. to give a solid cured resin sample.

Similar results are obtained when tetramethylammonium trifluoromethane sulfonate is employed as the catalyst.

Example 14

To 4 g. of liquid diglycidyl ether of Bisphenol A (Epon 828) was added 0.04 g. of methylammonium trifluoromethane sulfonate. This catalyzed mixture was placed in an aluminum cup and heated at 284° F. for 2 hrs. to give a solid cured resin sample.

Example 15

A one-part system is made by gradually adding 500 g. of a 1% by weight solution of $Zn(CF_3SO_3)_2$ in deionized water during about 1 hour to a stirred mixture of 500 g. Epon 828 with which had been mixed 12.5 g. each of Pluronic F-88 and Pluronic L-31

$$HO(C_2H_4O)_n(C_3H_6O)_m(C_2H_4O)_nH$$

where $n$ is about 33 and $m$ about 100 and where $n$ is about 14 and $m$ about 1.2, respectively) and 1 g. of a polyoxyethylene adduct of polydimethylsiloxane (L-5310 of Union Carbide Corp.). Stirring is effected in a high shear mixer and viscosity increases as a water-in-oil emulsion forms. This inverts to an oil-in-water emulsion with a great decrease in viscosity when about one half the aqueous solution has been added. Stirring is reduced at this point during addition of the remaining catalyst solution. This emulsion is found to have an extended shelf-life of many months. It is applied to a substrate such as sheet metal by dipping, spraying, knife coating, brushing or flow coating and cures to a thermoset film when air dried and heated at 200° C. for 5 minutes. Aqueous dispersions of pigments may be incorporated in the emulsion as desired. A water-in-oil emulsion is made as above, using a lower proportion of water to contain the catalyst.

Replacement of the $Zn(CF_3SO_3)_2$ by other metal salt catalysts provides systems curing at 200° C. for various times as follows:

| Catalyst: | Cure Time (min.) |
|---|---|
| $Cu(CF_3SO_3)_2$ | 8 |
| $Cd(CF_3SO_3)_2$ | 30 |
| $AgCF_3SO_3$ | 20 |
| $Yt(CF_3SO_3)_3$ | 9 |
| $Pb(CF_3SO_3)_2$ | 20 |
| $Mn(CF_3SO_3)_2$ | 30 |
| $Ni(CF_3SO_3)_2$ | 10 |

What is claimed is:

1. The process comprising the steps of mixing cationic sensitive monomer with a catalyst consisting of sulfonic acid salt and heating the resulting mixture at 120 to 425° F. to effect cure thereof in the absence of halide promoter, photoreducible ketone, or without requiring actinic light, wherein said monomer is an ethylenically unsaturated hydrocarbon, an ethylenically unsaturated compound having an oxygen or nitrogen atom attached to one of the carbon atoms of a carbon-to-carbon double bond or is polymerizable by ring opening of cyclic groups containing a hetero oxygen or nitrogen ring atom, and is selected from the group consisting of vicinal epoxides, vinyl ethers, N-vinyl compounds, aziridines, ethylenically unsaturated hydrocarbons and acetals and said sulfonic acid salt has the formula $(R_fSO_3)_nM$, where $R_f$ is fluoroalkyl having 1 to 18 carbon atoms, M is ammonium cation, quaternary ammonium cation, cation of amine, or cation of metal selected from Groups I to V and VIII, subgroups VI–B and VII–B, and lanthanide and actinide series of metals of the Periodic Table, and $n$ is an integer equal to the valence of M.

2. The process according to Claim 1 wherein the cationic sensitive monomer is vicinal epoxide monomer.

3. The process of Claim 2, wherein M is ammonium cation.

4. The process of Claim 2, wherein M is cation of amine.

5. The process according to Claim 2, wherein the sulfonic acid salt is $CF_3SO_3Ag$.

6. The process according to Claim 1, wherein the mixture of monomer and sulfonic acid salt further is initially triggered either by irradiation with ultraviolet light or thermally prior to effecting final cure of said mixture by heating at 120 to 425° F.

7. The process according to Claim 2 wherein the vicinal epoxide is dispersed in an aqueous solution of the catalyst and water is removed before heating sufficiently to effect curing.

8. The process according to Claim 2, further comprising applying or shaping the mixture of catalyst and sulfonic acid salt prior to heating at 120 to 425° F.

9. The process of Claim 2, wherein M is metal cation.

10. The process according to Claim 9 wherein the metal cation is silver.

11. The process according to Claim 9 wherein the metal cation is zinc.

12. The process according to Claim 9 wherein the metal cation is nickel.

13. The process according to Claim 9 wherein the metal cation is copper.

14. The process according to Claim 9 wherein the metal cation is lead.

15. The process according to Claim 9 wherein the metal cation is manganese.

16. The process according to Claim 9 wherein the metal cation is lanthanum.

17. A composition consisting essentially of a mixture of cationic sensitive monomer and catalyst consisting of sulfonic acid salt having the formula $(R_fSO_3)_nM$, where $R_f$ is fluoroalkyl having 1 to 18 carbon atoms, M is ammonium cation, quaternary ammonium cation, cation of amine, or cation of metal selected from group consisting of metals of Groups II, IV, V, and VIII, subgroups I–A, III–B, VI–B and VII–B, and lanthanide and actinide series of metals of the Periodic Table, and $n$ is an integer equal to the valence of M, wherein said monomer is an ethylenically unsaturated hydrocarbon, an ethylenically unsaturated hydrocarbon and having an oxygen or nitrogen atom attached to one of the carbon atoms of a carbon-to-carbon double bond or is polymerizable by ring opening of cyclic groups containing a hetero oxygen or nitrogen ring atom, and is selected from the group consisting of vicinal epoxides, vinyl ethers, N-vinyl compounds, aziridines, ethylenically unsaturated hydrocarbons and acetals.

18. The composition of Claim 17 wherein the cationic sensitive monomer is vicinal epoxide.

19. The composition of Claim 18 wherein M is ammonium.

20. The composition of Claim 18, wherein M is cation of amine.

21. The composition of Claim 18, wherein M is metal cation.

22. The composition of Claim 18 irradiated with actinic light to increase the rate at which it can be subsequently cured at elevated temperature.

23. The composition of Claim 18 wherein the catalyst is dissolved in water.

References Cited
UNITED STATES PATENTS 3,347,676   10/1967   Cripps _____ 96—115
3,586,616   6/1971   Krupp _____ 260—47 X WLLIAM H. SHORT, Primary Examiner T. E. PERTILLA, Assistant Examiner U.S. Cl. X.R.

96—115 P; 117—124 E, 128.4, 161 ZB; 161—184; 204—159.11, 159.24; 252—426, 431 R; 260—2 A, 2 EN, 37 R, 29.2 EP, 37 EP, 47 EP, 51 EP, 67 FP, 79.7, 88.3 A, 88.3 R, 91.1 A, 93.1, 93.5 A, 93.7 94.3, 830 TW

UNITED STATES PATENT OFFICE
CERTIFICATE OF CORRECTION

Patent No. 3,842,019　　　　　　　　　　Dated October 15, 1974

Inventor(s) James E. Kropp

It is certified that error appears in the above-identified patent and that said Letters Patent are hereby corrected as shown below:

Column 2, line 39, "nickel copper," should read -- nickel, copper, --.

Column 2, line 40, "lead bismuth tungsten" should read -- lead, bismuth, tungsten, --.

Column 7, line 49, "should be be" should read -- should not be --.

Column 8, line 65, the formula "$(CF_2SO_3)_3Bi$" should read -- $(CF_3SO_3)_3Bi$ --.

Column 9, line 47, the formula "$BF_3NH_2C_2H_5$" should read -- $BF_3 \cdot NH_2C_2H_5$ --.

Column 9, line 48, the formula "$BF_3NH_2C_2H_5$" should read -- $BF_3 \cdot NH_2C_2H_5$ --.

Column 11, line 8, "through a nip roll" should read -- through nip rolls --.

Signed and sealed this 18th day of February 1975.

(SEAL)
Attest:

RUTH C. MASON
Attesting Officer

C. MARSHALL DANN
Commissioner of Patents
and Trademarks